(12) United States Patent
Kasravi

(10) Patent No.: US 10,420,419 B2
(45) Date of Patent: Sep. 24, 2019

(54) PERSONALIZED DESKTOP ORGANIZER

(71) Applicant: Kas Kasravi, West Bloomfield, MI (US)

(72) Inventor: Kas Kasravi, West Bloomfield, MI (US)

(73) Assignee: Kas Kasravi, West Bloomfield, MI (US)

( * ) Notice: Subject to any disclaimer, the term of this patent is extended or adjusted under 35 U.S.C. 154(b) by 0 days.

(21) Appl. No.: 15/970,798

(22) Filed: May 3, 2018

(65) Prior Publication Data

US 2018/0317649 A1 Nov. 8, 2018

Related U.S. Application Data

(60) Provisional application No. 62/501,064, filed on May 3, 2017.

(51) Int. Cl.
*A47B 47/00* (2006.01)
*F16B 1/00* (2006.01)
(Continued)

(52) U.S. Cl.
CPC ........ *A47B 47/0091* (2013.01); *A47B 21/045* (2013.01); *A47B 97/00* (2013.01); *A47G 7/06* (2013.01); *B42F 7/145* (2013.01); *B43M 99/001* (2013.01); *B43M 99/002* (2013.01); *B43M 99/008* (2013.01); *B43M 99/009* (2013.01); *F16B 1/00* (2013.01); *A47B 23/04* (2013.01); *A47B 2200/0084* (2013.01);
(Continued)

(58) Field of Classification Search
CPC ..... A47B 47/0091; A47B 23/04; A47B 63/00; A47B 88/969; A47B 21/045; A47B 97/00; A47B 2200/0084; B43M 99/001; B43M 99/008; B43M 99/009; B43M 99/002; F16B 1/00; F16B 2/20; F16B 2001/0028; F16B 2001/0035; A47G 1/14; A47G 7/041; A47G 23/0208; A47G 2200/10; A47G 1/17; A47G 7/06; Y10S 211/01
USPC .......... 211/10, DIG. 1, 26.2; 248/683, 206.5, 248/309.4, 350
See application file for complete search history.

(56) References Cited

U.S. PATENT DOCUMENTS 4,074,810 A * 2/1978 Juergens .................... B42F 7/12
211/11
4,406,368 A * 9/1983 Hermes ................ B43M 99/008
206/1.7

(Continued)

*Primary Examiner* — Jennifer E. Novosad

(57) ABSTRACT

A plurality of desktop organizers, which helps users select and optimally arrange desktop organizers on desktops in a personalized manner. The core components of the invention are a plurality of desktop organizers each having a base, an overlay and magnets as temporary fasteners, where the overlays are configured for storing different office implements, which, generally speaking, are configured as follows: the dimensions of the desktop organizers promote coupling the organizers, ensuring alignment when brought to close to each other; the magnets are located on the sides of the desktop organizers such that they align with one another; and, a set of overlays, one for each type of office implement, fitting over the top of the desktop organizers. The invention can be used to select and arrange desktop organizers in a personalized manner that promotes optimal use of the surface of a desk.

16 Claims, 10 Drawing Sheets

(51) Int. Cl.
  *B43M 99/00* (2010.01)
  *A47B 21/04* (2006.01)
  *A47B 97/00* (2006.01)
  *A47G 7/06* (2006.01)
  *B42F 7/14* (2006.01)
  *A47G 23/02* (2006.01)
  *A47G 7/04* (2006.01)
  *A47G 1/14* (2006.01)
  *A47B 23/04* (2006.01)
  *F16B 2/20* (2006.01)

(52) U.S. Cl.
  CPC ............... *A47G 1/14* (2013.01); *A47G 7/041* (2013.01); *A47G 23/0208* (2013.01); *F16B 2/20* (2013.01); *F16B 2001/0028* (2013.01); *F16B 2001/0035* (2013.01)

(56) References Cited

U.S. PATENT DOCUMENTS

| | | | | |
|---|---|---|---|---|
| 4,429,796 A * | 2/1984 | Sussman | ............... | B43M 99/008 206/558 |
| 4,472,843 A * | 9/1984 | Chermak | ............... | A47K 3/004 108/13 |
| 4,570,793 A * | 2/1986 | O'Neil | ............... | B43M 99/001 206/214 |
| 4,802,593 A * | 2/1989 | Romanos | ............... | B43M 99/00 211/10 |
| 4,907,703 A * | 3/1990 | Alger | ............... | B42D 5/006 211/10 |
| 4,953,696 A * | 9/1990 | Huang | ............... | B43M 99/008 206/214 |
| 5,011,018 A * | 4/1991 | Keffeler | ............... | B65D 83/0445 206/532 |
| 5,224,594 A * | 7/1993 | Hou | ............... | B43M 99/001 206/214 |
| 5,265,735 A * | 11/1993 | Hassel | ............... | G06F 3/0202 206/214 |
| 5,377,850 A * | 1/1995 | Liaw | ............... | B43M 99/008 211/11 |
| 5,601,193 A * | 2/1997 | Santoya | ............... | G09F 1/103 211/11 |
| 5,657,880 A * | 8/1997 | Birnbaum | ............... | B42F 7/12 211/11 |
| 5,755,321 A * | 5/1998 | Wang | ............... | B43M 99/008 206/214 |
| 6,519,883 B2 | 2/2003 | Martorella | | |
| 7,571,823 B2 * | 8/2009 | Richardson | ............... | A47F 5/00 211/10 |
| 7,591,382 B2 * | 9/2009 | Brock | ............... | A45D 33/26 211/10 |
| 7,661,581 B2 | 2/2010 | Lin | | |
| 8,100,270 B2 * | 1/2012 | Kuznetsov | ............... | A47F 3/004 211/13.1 |
| 10,028,596 B2 * | 7/2018 | Markwick | ............... | A47K 10/18 |
| 2002/0104811 A1 | 8/2002 | Young | | |
| 2006/0244348 A1 * | 11/2006 | Richied | ............... | A47B 87/0292 312/108 |
| 2007/0272629 A1 * | 11/2007 | Spirer | ............... | A47B 49/00 211/10 |
| 2008/0011697 A1 * | 1/2008 | Berg | ............... | A47B 49/00 211/78 |
| 2009/0013566 A1 | 1/2009 | Cetera | | |
| 2009/0321374 A1 * | 12/2009 | Carr | ............... | A47K 1/09 211/65 |
| 2015/0335149 A1 | 11/2015 | Vickers | | |

\* cited by examiner

PERSONALIZED DESKTOP ORGANIZER

PRIORITY STATUS

This application claims the benefit of U.S. Provisional Application No. 62/501,064, filed May 3, 2017. The content of U.S. Provisional Application 62/501,064 is incorporated herein by reference for all purposes.

BACKGROUND OF THE INVENTION

1. Field of the Invention

The present invention relates generally to office equipment, and specifically to desktop organizers.

2. Background

Most professionals and office workers need to store and organize various office implements on their desks. Office implements are any small artifacts used at a desk such as paperclips, staplers, erasers, sticky notes, memory cards, USB sticks, pens, scissors, and other similar objects. Desktop space is often at a premium and it is necessary to make optimal use of the desktop space.

Currently there are a number of solutions for desktop organizers to store and organize office implements. Some of these solutions attempt to provide a single desktop organizer for one office implement, but these solutions fail to meet the needs of the industry because they can get scattered on the desk, easily taken away by others, and require searching by the user. Other solutions attempt to combine multiple desktop organizers into a single unit, also known as "all-in-one", allowing the storage of multiple office implements, but these solutions are similarly unable to meet the needs of the industry because such solutions are bulky, take up too much desk, and often provide storage space not needed by the user.

It would be desirable to have a set of desktop organizers that can precisely fit the needs of the user, which best utilizes the limited the desktop space. Furthermore, it would also be desirable to have a desktop organizer that can be arranged by the user to fit the open spaces of the desktop. Still further, it would be desirable to have a desktop organizer that can be rearranged to adapt to the changing needs of the user. Therefore, there currently exists a need in the industry for a desktop organizer that can be personalized to the user's needs, make optimal use of the available desktop space, and adapt to the changing requirements for storing office implements.

SUMMARY OF THE INVENTION

The present invention advantageously fills the deficiencies by providing a personalized desktop organizer, which provides the user with exactly what is needed to store and organize office implements, adapt to the available space on the desktop, and reconfigure at a later date.

The present invention is a personalized desktop organizer, which is made up of the following components: a plurality of desktop organizers each having an overlay for office implements, a base, and a temporary fastener such as a magnet. The sides of the desktop organizers have proportional lengths such that the desktop organizers align with each other when placed next to one another. At least one magnet is located on each side of each desktop organizer, such that the desktop organizers easily and temporarily couple together when brought near each other. With the aid of the magnets, the desktop organizers align themselves with minimal effort by the user. The desktop organizers can be effortlessly pulled apart and snapped together in different configurations. The overlay is attached to the top of the desktop organizer base to accommodate an office implement.

The present invention also has one or more of the following: plurality of temporary fasteners, such as magnets, hook-and-loop, and clips; plurality of overlays that are separate from the base for added design flexibility; and the plurality of overlays for storing and organizing common office implements. The magnets attach to each side of the desktop organizers in a manner such that the desktop organizers line up and attach when a pair of the desktop organizers are brought together. The overlays seamlessly fit over the bases of the desktop organizers.

The present invention is unique when compared with other known devices and solutions because it provides: (1) grouping multiple desktop organizers into a single organizer; (2) personalizing the selection and arrangement of the desktop organizers to meet the exact needs of the user; and (3) optimal use of the available desktop space for storing and organizing office implements.

The present invention is unique in that it is structurally different from other known devices or solutions. More specifically, the present invention is unique due to the presence of: (1) temporary fasteners, such as magnets, on each side of the desktop organizers; (2) proportional sizing of the desktop organizers to promote optimal alignment; and (3) plurality of overlays to store and organize common office implements.

Among other things, it is an objective of the present invention to provide a personalized desktop organizer that does not suffer from any of the problems or deficiencies associated with prior solutions.

It is an objective of the present invention to create a desktop organizer that can readily attach and align with similar desktop organizers. It is further an objective of the present invention to provide desktop organizers of different sizes that accommodate a wide variety of office implements. It is still further an objective of the present invention to provide a wide variety of overlays for storing and organizing common office implements. Further still, it is an objective of the present invention to provide the user with the ability to select the right desktop organizers and personalize their arrangement on the desk.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The present invention is directed to a personalized desktop organizer. Multiple personal desktop organizers are used in conjunction with each other to help the user create a personalized set of desktop organizers.

In its most complete version, the present invention is made up of the following components: a plurality of desktop organizers each having a base, where the base has a top, a bottom, and a plurality of sides, and each base having an overlay for storing different office implements, where the overlays attach to the top of their respective bases of the desktop organizers, and at least one magnet attached to each side of the desktop organizers. A preferred length is a minimum length desired for a side of the desktop organizers. Other sides of the desktop organizers have lengths equal to integer multiples of the preferred length. An integer multiple is the product of any quantity and an integer, such as 1,2,3,4, or 5. As such, the base of the desktop organizers assume dimensions that allow the symmetrically couple alongside one another. At least one magnet is located on each side of the desktop organizers, such that the desktop organizers easily and temporarily snap together when placed in close proximity by the user. If a side has the preferred length, then a magnet is attached at the mid-point of the side. If the side is an integer multiple larger than the preferred length, then multiple magnets are attached to the side, such that the outermost magnets are half the preferred length from the nearest edge, and the other magnets are separated by a distance equal to the preferred length. Thus, the magnets attach to each side of the desktop organizer in a symmetrical manner such that they line up and attach when a pair of desktop organizers are brought together. In the preferred embodiment of the present invention magnets are used as temporary fasteners are magnets, but a person having ordinary skill in the art would recognize that other means such as hook and loop and clips may also be used in place of magnets. The desktop organizers align themselves with minimal effort by the user when the desktop organizers are brought near one another. The desktop organizers can be effortlessly pulled apart and snapped together in different configurations. The overlays are on top of the desktop organizer are configured to accommodate various office implements. Optionally, the overlays are either temporary or permanently attached to the bases of the desktop organizers.

Figure 1:
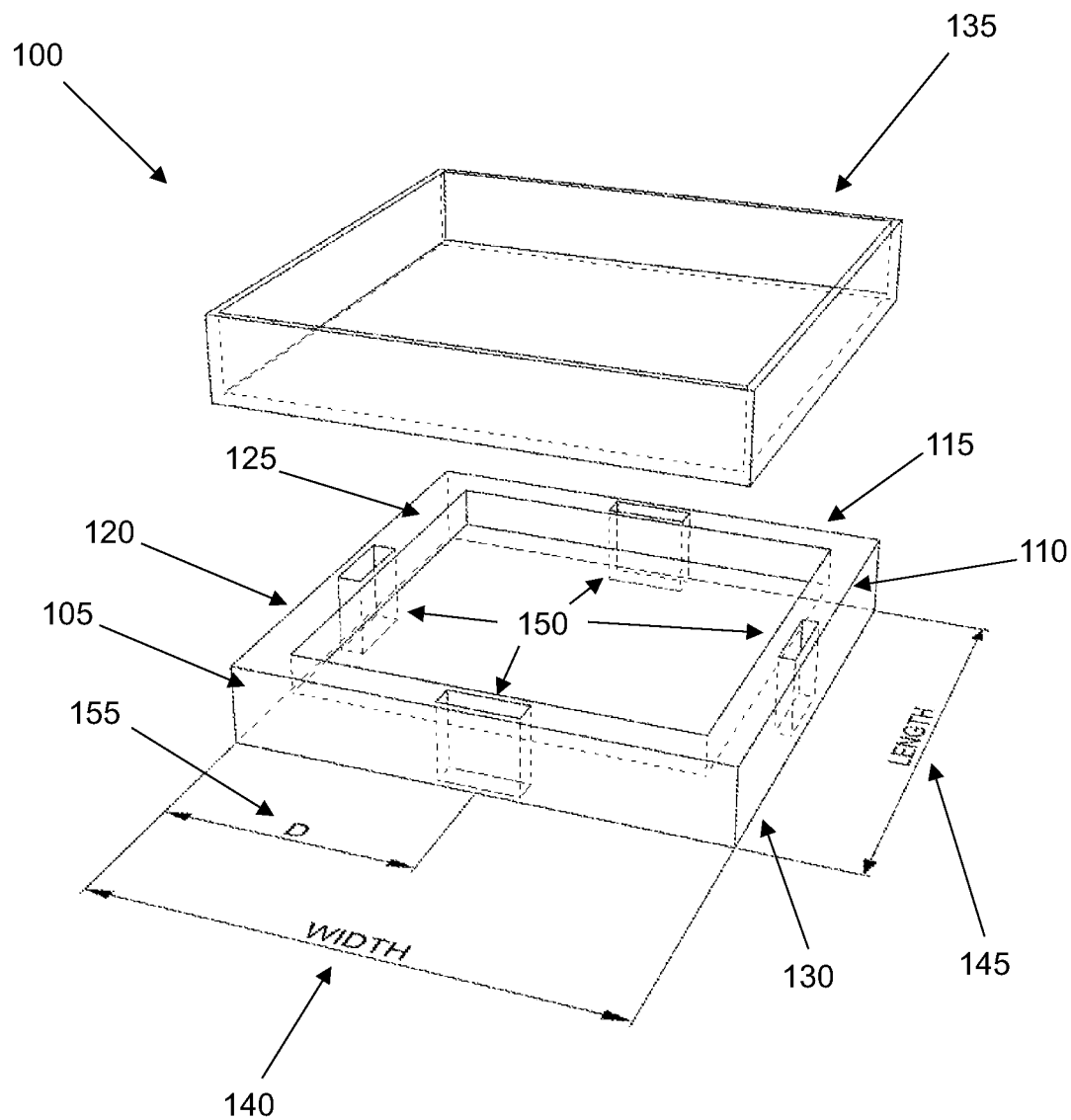
FIG. 1 shows the perspective view of a simple desktop organizer base and overlay, and the location of the temporary fasteners.

FIG. 1 illustrates an exemplary personalized desktop organizer base, where a desktop organizer 100 has a front side 105, a right side 110, a back side 115, a left side 120, and top side 125, and a bottom side 130. An overlay 135 is provided on the top side 125 configured for storing and organizing various office implements; in this illustration the overlay is a tray. The desktop organizer 100 has a width 140 and a length 145. Magnets 150 are provided on each side of the desktop organizer 100. The center of the fastener shown in FIG. 1 is a distance D 155 from each edge, where D is half the preferred length. D is a constant distant for a set of desktop organizers. The preferred length is an arbitrary length chosen for a set of personalized desktop organizers, and all other widths and length are integer multiples of the minimum width in order to maintain alignment and symmetry. As described earlier, if a side has the preferred length, then a magnet is attached at the mid-point of the side. If the side is an integer multiple larger than the preferred length, then multiple magnets are attached to the side, such that the outermost magnets are half the preferred length from the nearest edge, and the other magnets are separated by a distance equal to the preferred length. Thus, the width 140 and the length 145 are also integer multiples of each other. For example, if the preferred length is 5 cm long, then D is 2.5 cm, and the desktop organizer 100 assumes width/length dimensions such as 5×5, 5×10, 5×15, 5×20, 10×10, 10×15, 15×15, 20×20 and so forth.

The magnets 150 allows different desktop organizers to snap together when brought close to each other, enabling different desktop organizer units to temporarily adhere to one another and act as a single unit. In the preferred embodiment of the present invention the magnets 150 are embedded within each side of the desktop organizer. A person having ordinary skill in the art would easily recognize that options other than magnets are also available, such as hook and loop, clips, key and slot, and non-drying glues.

Figure 2:
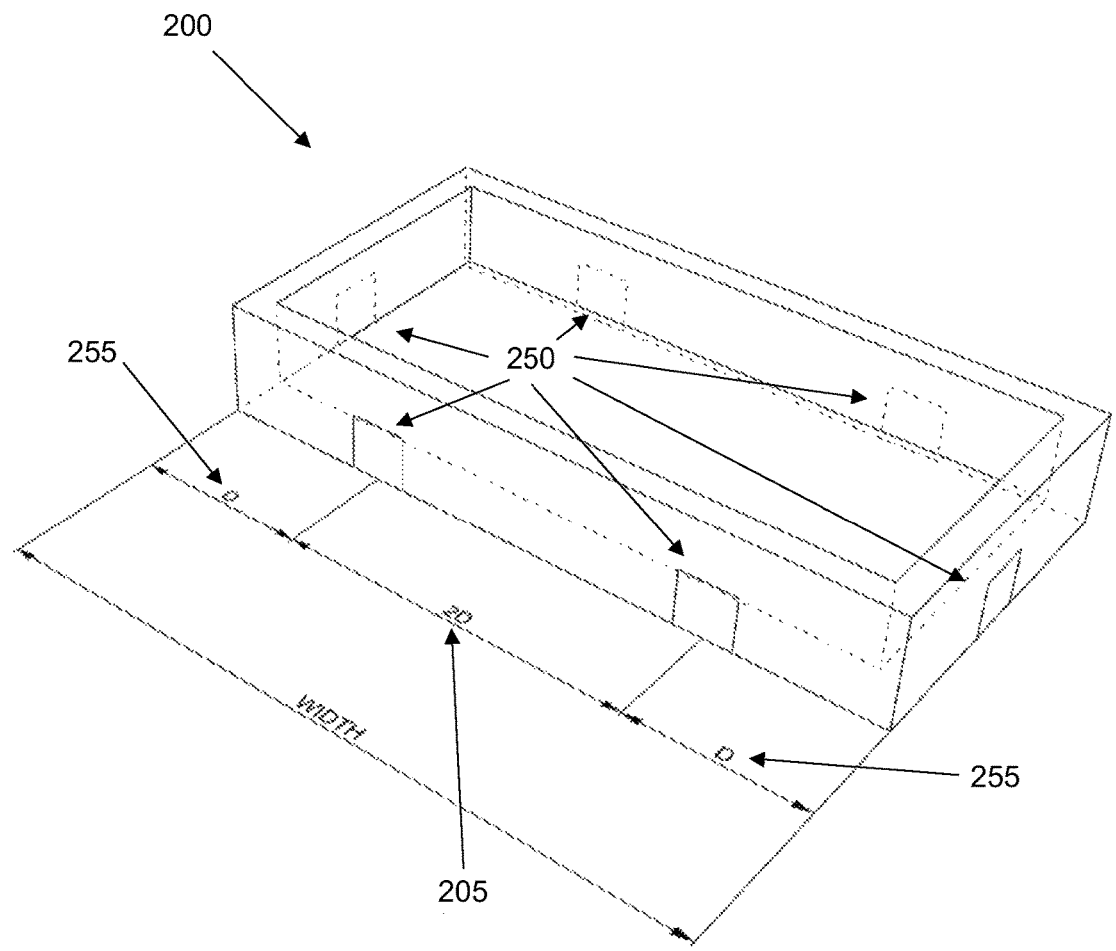
FIG. 2 shows the perspective view of a proportional rectangular desktop organizer base with multiple temporary fasteners on two sides.

While the exemplary desktop organizer 100 in FIG. 1 was essentially square in shape, where the width equals the length, FIG. 2 illustrates a rectangular desktop organizer base 200, where the width is twice the length, hence an integer multiple of 2. In such cases, where the width or the length is a multiple of the preferred length, then the magnets 250 are placed such that the distance D 255 is maintained from the nearest edge, and the distance between the remaining magnets is equal to the preferred length, or 2D. In the instance shown in FIG. 2, the width is twice the minimum width, thus the distance between the magnets 250 is 2D 205. Additional magnets 250 will be added to each side as the width and the length increase in integer multiples of the preferred length.

Figure 3:
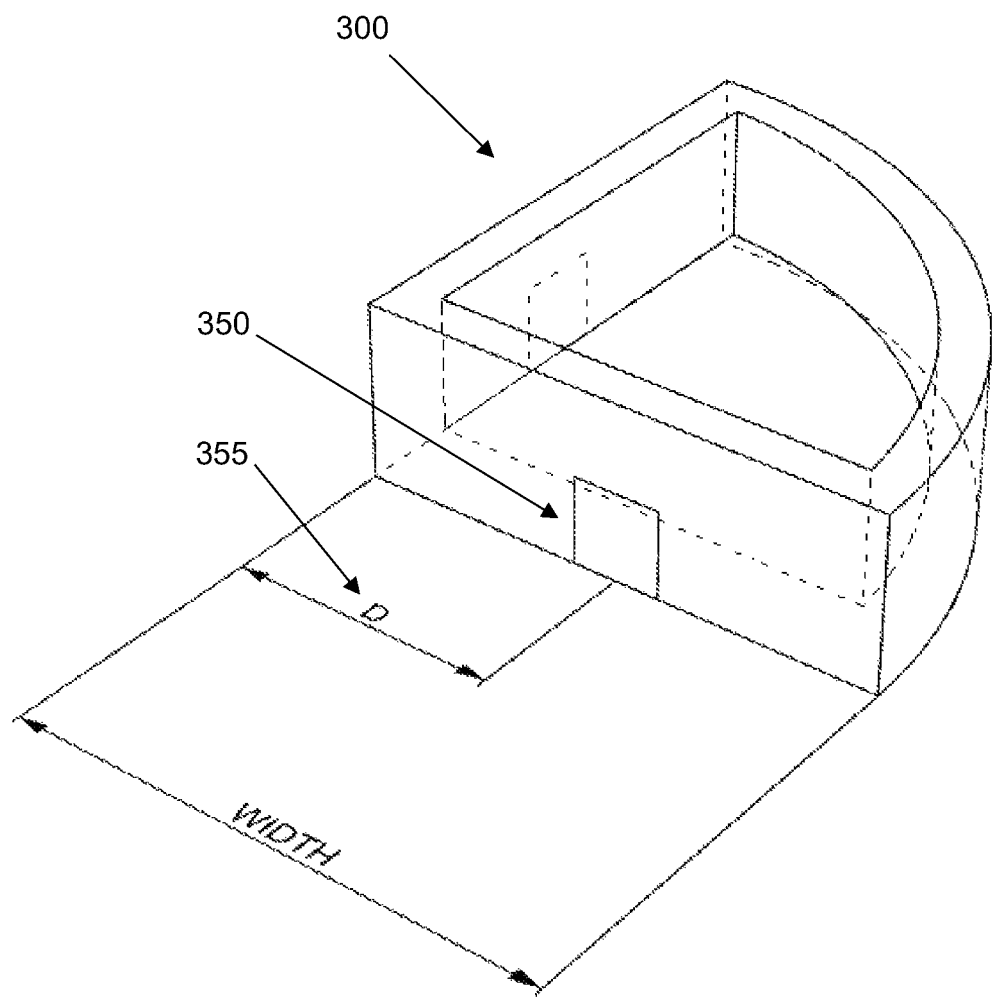
FIG. 3 shows the perspective view of a corner desktop organizer base.

The overall shape of the desktop organizer is not limited to a rectangular shape. Other shapes such as wedge, triangle, corner, and polygons are included; however, all such shapes are consistent with the aforementioned ratios between the width 140, the length 145, and D 155, such that the magnets 150 always line up and the desktop organizers couple together in an aligned fashion. For example, FIG. 3 shows a corner desktop organizer base 300 that is a 90-degree corner, where the temporary fasteners magnets 350 are located distance D 355 from the edge as shown.

Figure 4:
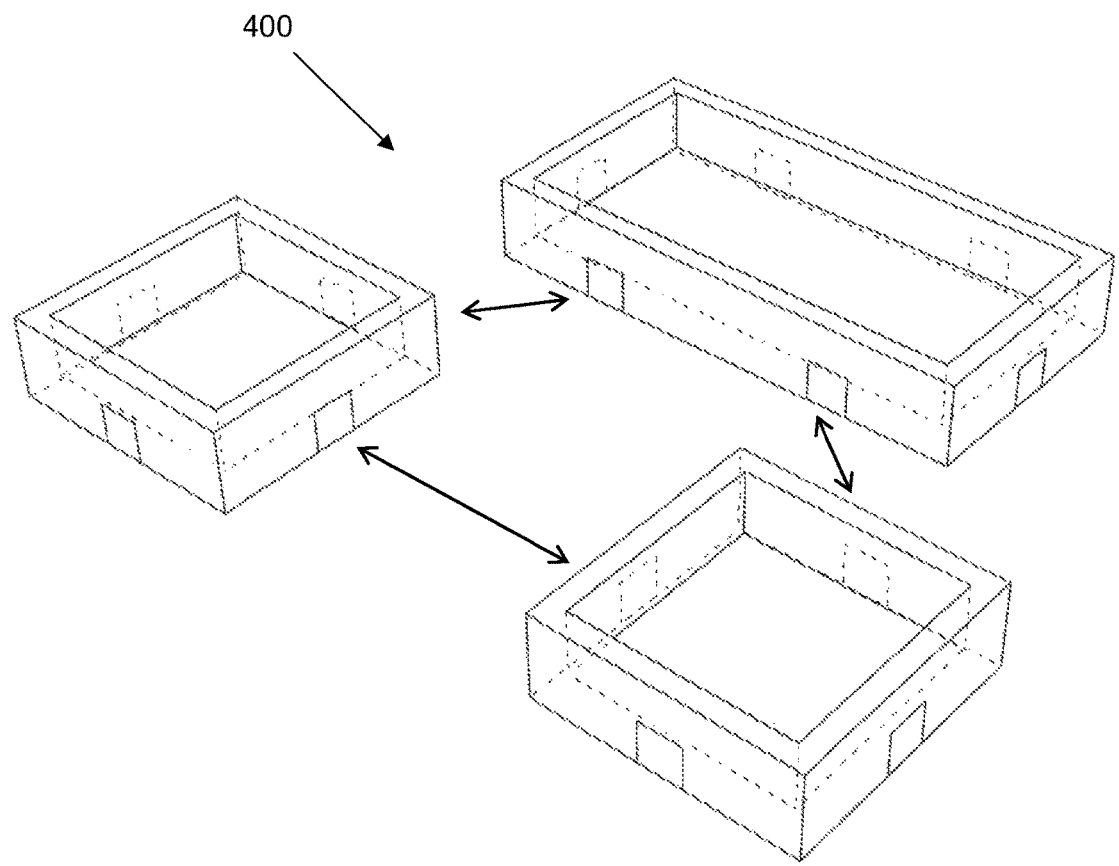
FIG. 4 shows the perspective view of the alignment of several desktop organizer bases.
Figure 5:
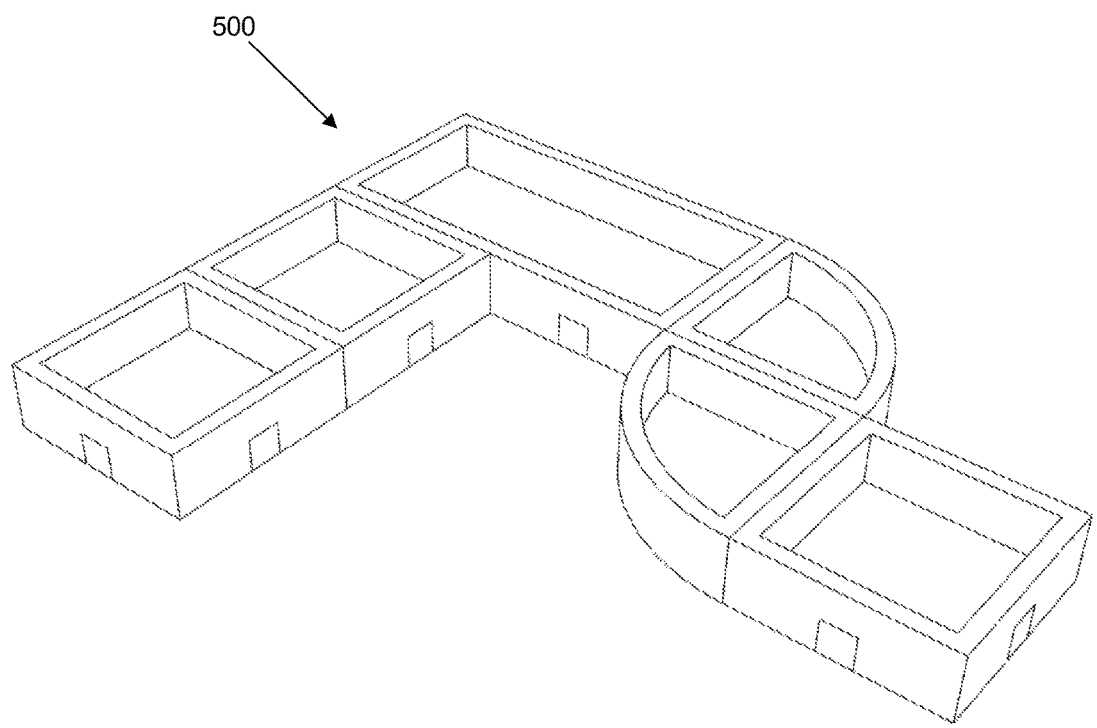
FIG. 5 shows the perspective view of one arrangement of a set of differently shaped desktop organizer bases.

A combination of different shapes allows the user to configure the overall shape of the desktop organizers in a desired fashion by snapping them together. FIG. 4 illustrates a simple combination 400 by bringing two square and one rectangular desktop organizer bases together. FIG. 5 shows a different combination 500 by bringing together and snapping three square, two corners, and one rectangular desktop organizer bases. FIGS. 4 and 5 shows how the user creates the desired overall desktop organizer by putting together differently shaped desktop organizers. Thus, making the optimal use of the available desktop and using only the desktop organizers needed by the user.

Figure 6:
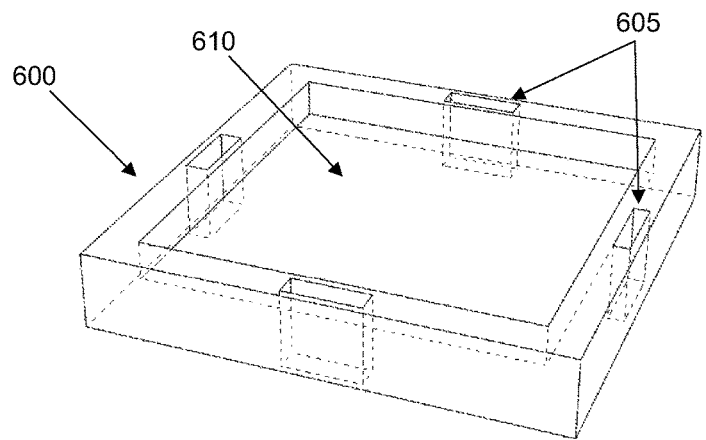
FIG. 6 shows the perspective view of the base of a simple desktop organizer along with pockets for magnets on each side.
Figure 7:
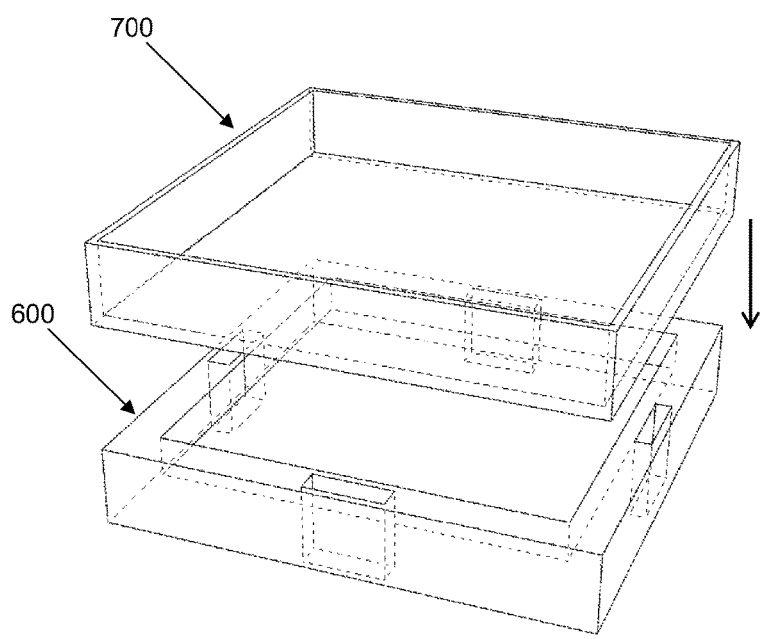
FIG. 7 shows the perspective view of a tray overlay fitting over the base of a desktop organizer.

FIGS. 6 and 7 illustrate an aspect of the preferred embodiment of the present invention, where the bottom side 600 and the overlay 700 of the desktop organizer are manufactured separately and subsequently assembled together. The assembly of the base and an overlay are either permanent, such as attached with glue, or temporary, such as attached with snap fits. The magnets 605 are positioned as indicated earlier, and a cavity 610 is created in the bottom side 600. Optionally, the base is weighed by adding a weight such as sand or a piece of lead for additional stability. The overlays can assume a plurality of geometries required for storing and organizing a variety of office implements. Thus, manufacturing costs are reduced by sharing a common base geometry and fabricating a variety of overlays for different office implements.

Office implements are artifacts used in an office such as but not limited to paperclips, staplers, erasers, sticky notes, business cards, notepads, memory cards, coins, USB sticks, digital media, pens, scissors, clocks, glasses, stamps, whiteout bottles, cups, pictures, tapes, mobile devices chargers, mobile device holders, flower and so forth.

Figure 8A:
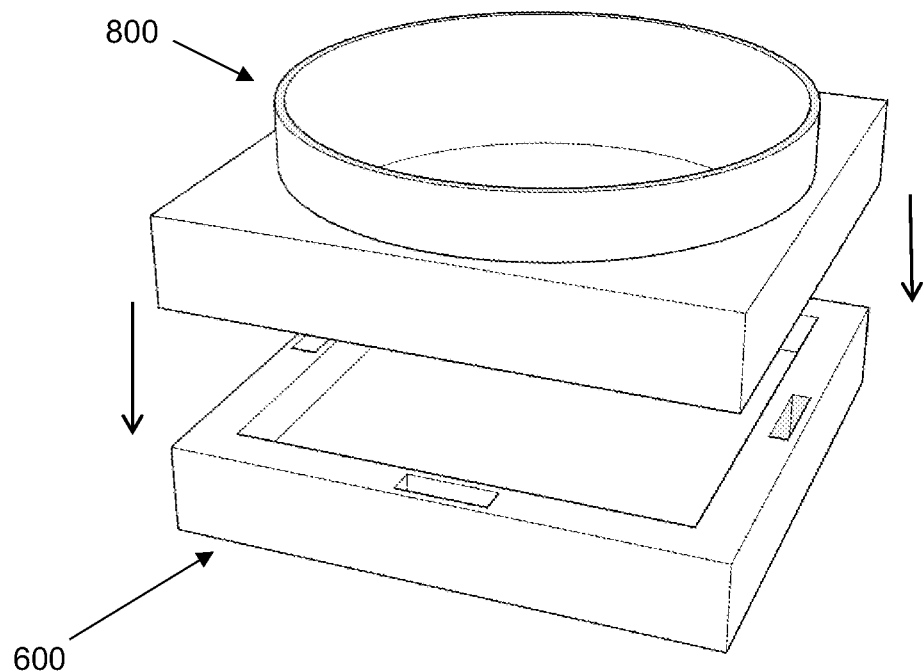
FIG. 8A shows the perspective view of an unassembled paperclip overlay fitting over the base of a desktop organizer.
Figure 8B:
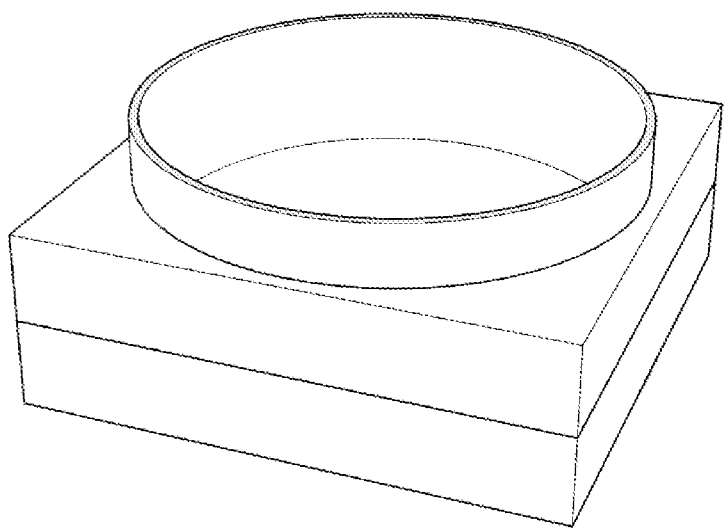
FIG. 8B shows the perspective view of an assembled paperclip overlay fitting over the base of a desktop organizer.
Figure 9A:
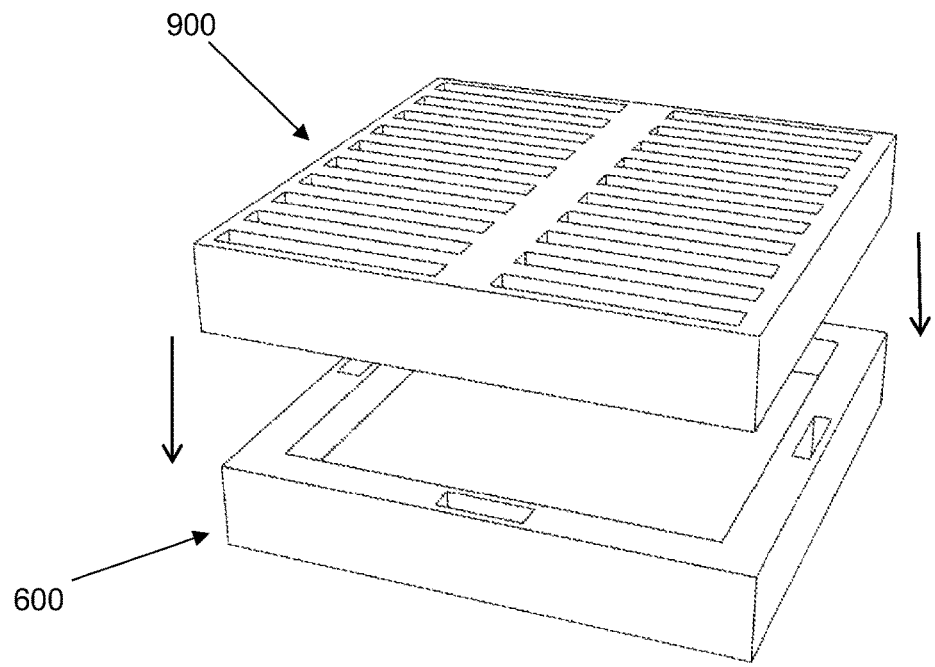
FIG. 9A shows the perspective view of an unassembled memory card overlay fitting over the base of a desktop organizer.
Figure 9B:
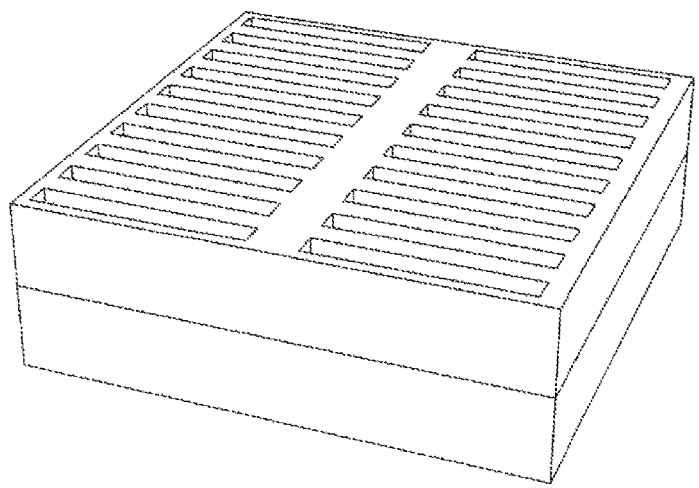
FIG. 9B shows the perspective view of an assembled memory card overlay fitting over the base of a desktop organizer.

FIG. 8A shows an exemplary overlay 800 that is a paperclip holder in an unassembled fashion, and FIG. 8B shows the paperclip holder in an assembled fashions over the base 600. FIG. 9A shows an exemplary memory card holder overlay 900 in an unassembled fashion, and FIG. 9B shows the memory card holder in an assembled fashions over the base 600.

Figure 10:
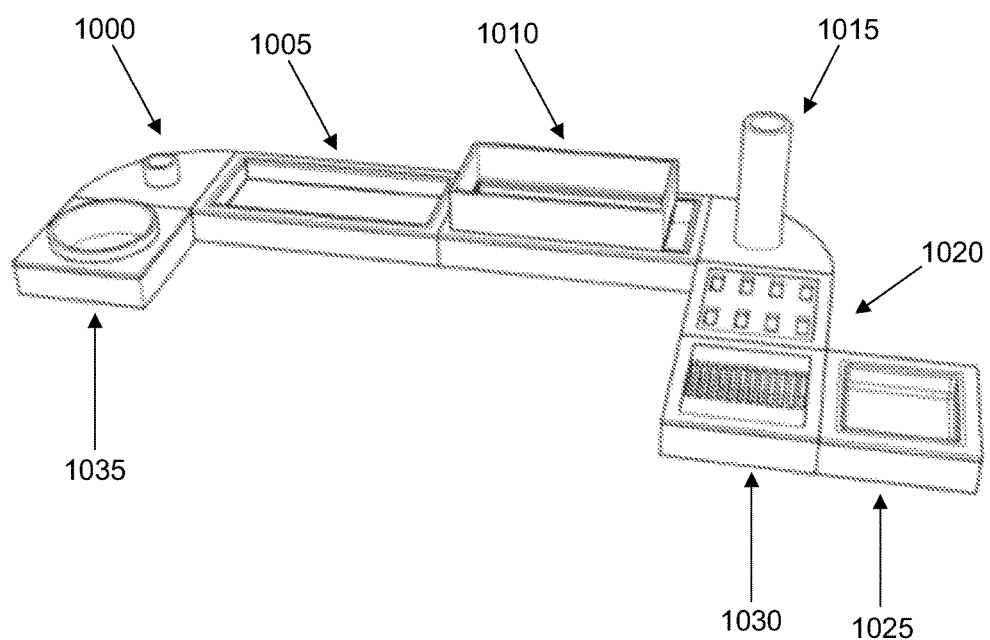
FIG. 10 shows the perspective view of one arrangement of various desktop organizer components.
Figure 11:
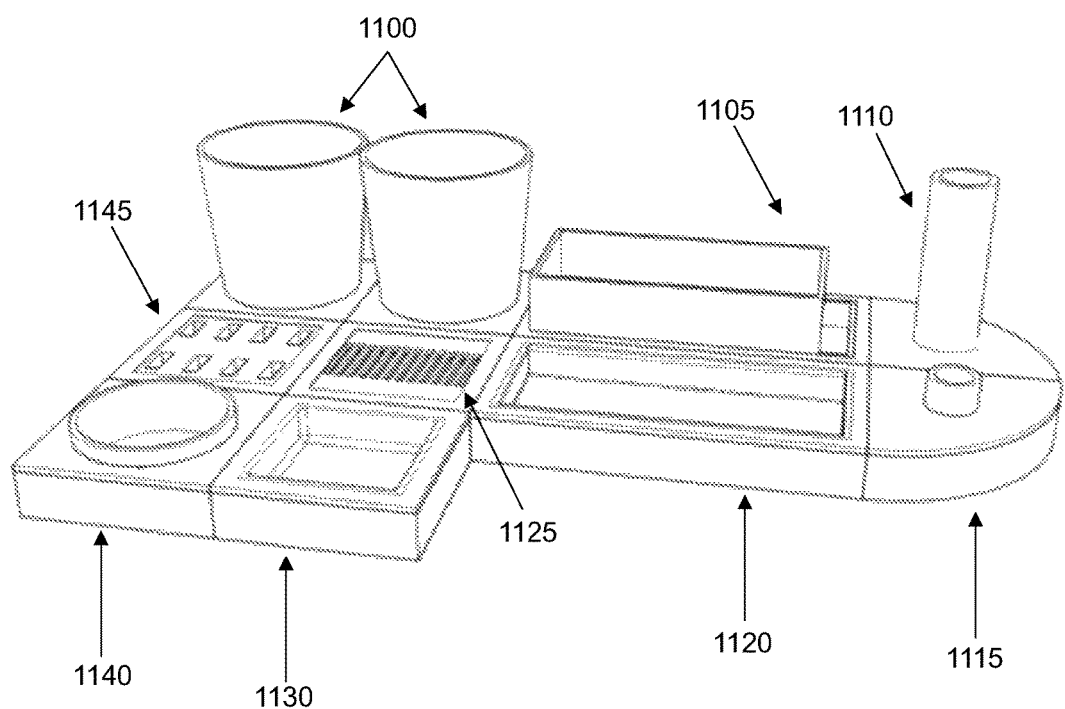
FIG. 11 shows the perspective view of a different arrangement of various desktop organizer components.

FIGS. 10 and 11 illustrates two different personalized arrangements of various desktop organizer components. FIG. 10 shows a corner pen holder 1000, a large tray 1005, a business card holder 1010, a flower holder 1015, a US stick holder 1020, a small tray, 1025, a memory card holder 1030, and a paperclip holder 1035. FIG. 11 shows two pen holders 1100, business card holder 1105, flower holder 1110, single pen holder 1115, large tray 1120, memory card holder 1125, coin holder 1130, paperclip holder 1140, and USB stick holder 1145.

The arrangements shown in FIGS. 10 and 11 are only two of numerous possible arrangements of the desktop organizer components. Thus, the personalized desktop organizer is a collection of individual components selected by a user for their utility, and temporarily snapped together by the user in a desired configuration. At a later date, the user can reconfigure the personalized desktop organizer by adding or removing desktop organizers and/or rearranging them.

While a number of materials are available for manufacturing the personalized desktop organizer, the preferred embodiment of the present invention is made with plastics such as ABS (Acrylonitrile-Butadiene-Styrene) via the injection molding process. A person having ordinary skill of the art would recognize that other materials such as wood and metals can also be used to manufacture the desktop organizer.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A personalized desktop organizer assembly comprising:
at least three desktop organizers, where each desktop organizer has a base and an overlay;
each base has a top, a bottom, a depth, and a plurality of first sidewalls, wherein an open space is formed therebetween and having a first open top;
each overlay has at least one cavity defined between a bottom surface and second sidewalls and having a second open top therebetween and configured to store small objects therein;
each overlay attaches to the top of a respective base, whereby the bottom surface of the overlay covers the respective open space and where the base and the respective overlay together form one of the desktop organizers;
the peripheral dimensions of each overlay matches the peripheral dimensions of the top of the respective base whereby the first sidewalls and the respective second sidewalls are aligned with one another ensuring a flush fit;
the bottom of the bases of the desktop organizers are adapted to remain in direct contact with a desk on which the desktop organizers are placed;
at least one magnet is located on each of the first sidewalls of each of the bases allowing for the desktop organizers to be coupled together adjacent one another, and each of the overlays do not comprise magnets;
the magnets are located and aligned on the first sidewalls of the bases such that the coupled desktop organizers remain temporarily fastened to each other with the magnets and that the bottom surfaces of the overlays rest upon the tops of the respective bases; and
the desktop organizers are configured to be horizontally placed on the desk and positioned around other objects on the desk in a personalized fashion.

2. The personalized desktop organizer assembly of claim 1, wherein the overlay is a tray.

3. The personalized desktop organizer assembly of claim 1, wherein the overlay is a pen holder.

4. The personalized desktop organizer assembly of claim 1, wherein the overlay is a digital media holder.

5. The personalized desktop organizer assembly of claim 1, wherein the overlay is a paperclip holder.

6. The personalized desktop organizer assembly of claim 1, wherein the overlay is a coin tray.

7. The personalized desktop organizer assembly of claim 1, wherein the overlay is a card holder.

8. The personalized desktop organizer assembly of claim 1, wherein the overlay is an eraser holder.

9. The personalized desktop organizer assembly of claim 1, wherein the overlay is a flower holder.

10. The personalized desktop organizer assembly of claim 1, wherein the overlay is a picture holder.

11. The personalized desktop organizer assembly of claim 1, wherein the overlay is a stapler holder.

12. The personalized desktop organizer assembly of claim 1, wherein the overlay is a note holder.

13. The personalized desktop organizer assembly of claim 1, wherein the overlay is a tape dispenser.

14. The personalized desktop organizer assembly of claim 1, wherein the overlay is a mobile device holder.

15. The personalized desktop organizer assembly of claim 1, wherein the overlay is a cup holder.

16. The personalized desktop organizer assembly of claim 1, wherein the overlay is an office accessory holder.

* * * * *